United States Patent
Yang

(10) Patent No.: US 6,687,188 B2
(45) Date of Patent: Feb. 3, 2004

(54) UNDERWATER TELEMETRY APPARATUS AND METHOD

(75) Inventor: Tsih Yang, Great Falls, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/145,615

(22) Filed: May 14, 2002

(65) Prior Publication Data

US 2003/0214881 A1 Nov. 20, 2003

(51) Int. Cl.$^7$ ................................................ H04B 11/00
(52) U.S. Cl. ........................ 367/134; 367/131; 367/119; 367/904
(58) Field of Search ............................... 367/118, 119, 367/124, 129, 125, 131, 134, 904, 905; 340/850; 375/6, 233, 347

(56) References Cited

U.S. PATENT DOCUMENTS

| | | | |
|---|---|---|---|
| 4,104,641 A | * 8/1978 | Unz | ............................ 367/905 |
| 5,301,167 A | 4/1994 | Proakis et al. | |
| 5,550,792 A | 8/1996 | Crandall et al. | |
| 5,559,757 A | 9/1996 | Catipovic et al. | |
| 5,784,339 A | 7/1998 | Woodsum et al. | |
| 5,822,276 A | * 10/1998 | Miklovic | ..................... 367/103 |
| 5,844,951 A | 12/1998 | Proakis et al. | |
| 6,130,641 A | * 10/2000 | Kraeutner et al. | ............ 367/131 |
| 6,130,859 A | 10/2000 | Sonnenschein et al. | |
| 6,292,433 B1 | 9/2001 | Gilbert et al. | |
| 6,323,823 B1 | 11/2001 | Wong et al. | |
| 2002/0012289 A1 | 1/2002 | Gilbert et al. | |

\* cited by examiner

Primary Examiner—Ian J. Lobo
(74) Attorney, Agent, or Firm—John J. Karasek; L. George Legg

(57) ABSTRACT

An apparatus for phase coherent underwater communications includes a transmitter; a receiver, including a processor for jointly performing coherent diversity combining, carrier recovery, channel equalization and synchronization; and an antenna array that includes a plurality of antenna sub-arrays for alternately transmitting a signal generated by the transmitter and for receiving an incoming signal. Each of the antenna sub-arrays includes a plurality of underwater sensors positioned such that each of the sensors is spaced at about one half the wavelength of the receiver/transmitter operating frequency from any adjacent sensor in the same sub-array. At least one of the sub-arrays has a centerpoint vertically spaced apart from a centerpoint of an adjacent sub-array at a distance about equal to or larger than a vertical correlation length of a received signal. The individual sub-arrays are beamformed, e.g. using a plane-wave delay-and-sum (or phase-steering) method. The outputs of the sub-array beamforming are used as inputs to a diversity-combining algorithm. Although a total of many elements of underwater sensors are used physically, the communications algorithm (the channel equalizer) sees effectively only a small number of channels. This reduces the required processing time by orders of magnitude.

20 Claims, 6 Drawing Sheets

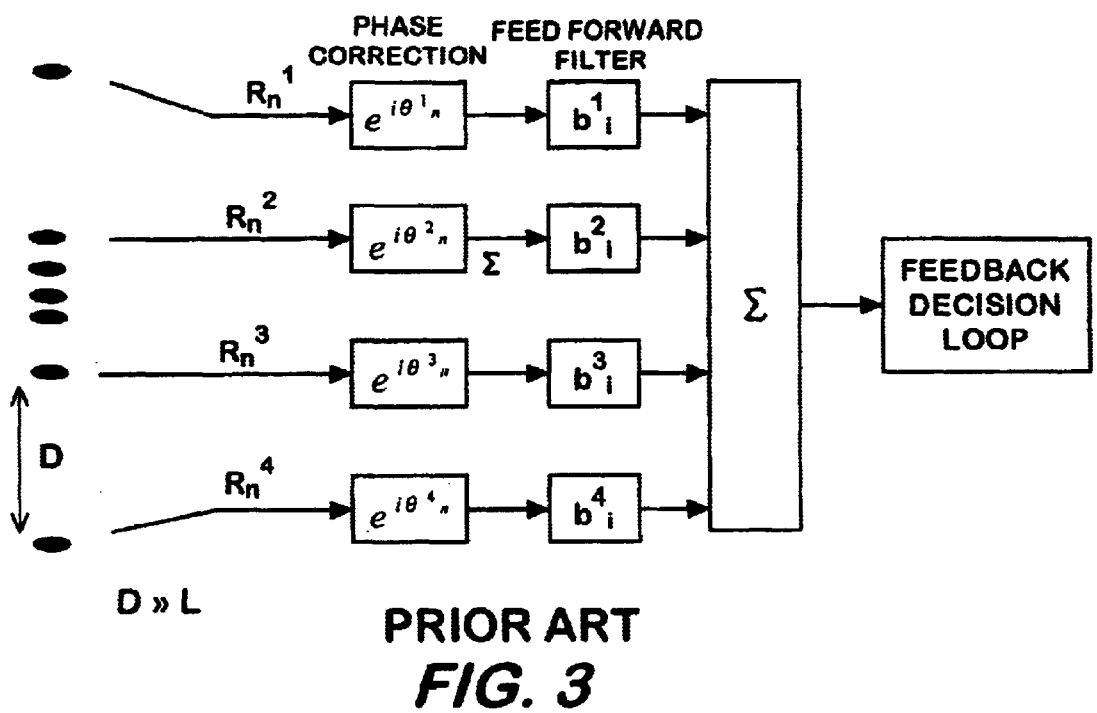
PRIOR ART
*FIG. 3*
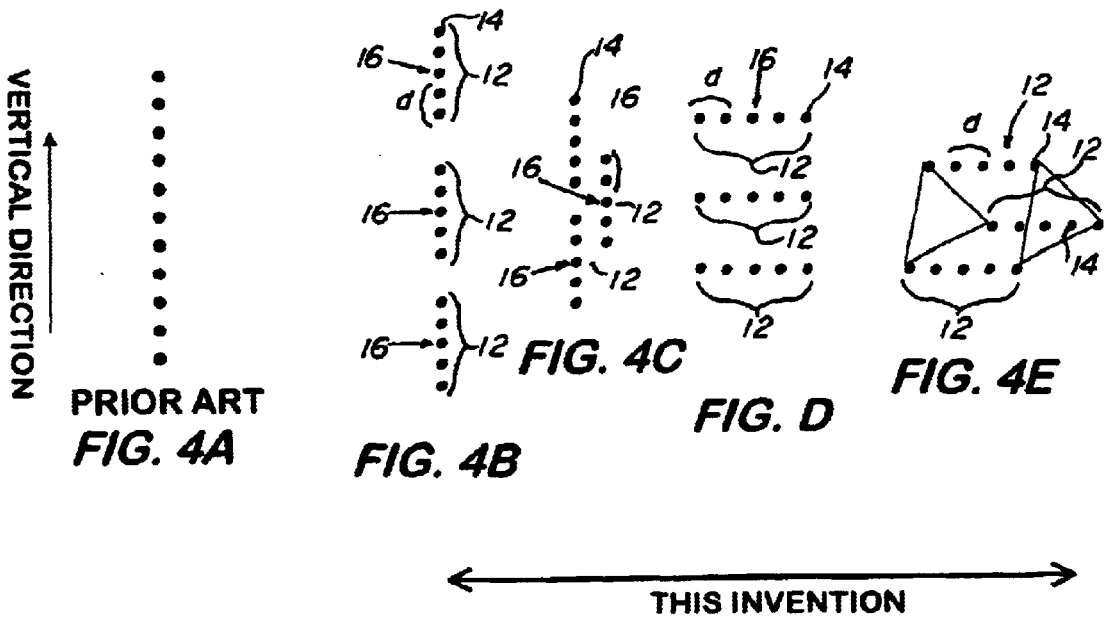
PRIOR ART
*FIG. 4A*    *FIG. 4B*    *FIG. 4C*    *FIG. D*    *FIG. 4E*
THIS INVENTION

UNDERWATER TELEMETRY APPARATUS AND METHOD

TECHNICAL FIELD

This invention relates to a method and device for phase coherent underwater acoustic communications. More particularly, the invention relates to a system for long range underwater acoustic communications using a combination of arrays and sub-arrays.

BACKGROUND ART

Phase Coherent Underwater Acoustic Communications (ACOMMS)

The ocean presents an acoustic communication channel, which is band-limited and temporally variable. Propagation in the horizontal can be severely influenced by macro and micro multipath variability. Vertical propagation is often less severely impacted by the multipath.

Incoherent communication schemes, using for example frequency shift keying algorithms, are used for line of sight propagation conditions in which multipath has minimal impact on the signals of interest. At long ranges, symbol rates for incoherent communications are limited by the multipath symbol interference. Additional processing (such as error encoding) is often required to remove the bit errors (due to symbol interference). The available frequency band is limited by frequency fading.

Coherent communication schemes use the available bandwidth more efficiently and provide higher data rates than the incoherent schemes for horizontal transmission of signals in a multipath environment. The state of the art systems use a (recursive) minimum least-mean-square (MLMS) approach for equalizing and updating the channel. The MLMS approach requires a certain minimum signal-to-noise ratio (SNR) at the receivers, of typically 10–15 dB. Maximum data rate and minimum bit error rate depend critically on the temporal properties of the channel impulse response function. The recursive least square (RLS) algorithm is computationally intensive and only a limited number (typically <4) of channels can be supported by prototype systems for real time communications.

An algorithm for phase coherent acoustic communications is described in U.S. Pat. Nos. 5,301,167 and 5,844,951, incorporated herein by reference. The latter patent extends the algorithm from a single receiver to multiple receivers; it uses jointly a phase locking loop and channel equalizer to adaptively correct for the channel temporal variation to minimize bit errors. The communication signals are transmitted by grouping symbols into packets. Each packet begins with a short pulse (e.g., a Barker code of 13 symbols of binary phases) used for symbol synchronization and an initial estimate of the multipath arrival structure. It is followed by a data packet beginning with a training data set with known symbols to estimate the carrier frequency (shift) and train the equalizer. The equalizer is updated by estimating the symbol errors using either the known symbol as in the training data or a decision on the received symbol. The number of tap coefficients is estimated from the impulse response deduced from the probe/trigger pulse. Carrier frequency is estimated from the training data. The data are fractionally sampled, typically 2 samples per symbol, and the most popular schemes for signal modulation are binary phase shift keying (BPSK) and/or quadrature phase shift keying (QPSK) signals. Channel impulse response and equalizer update requires a minimal input signal-to-noise (SNR) ratio for minimal bit errors. Multiple receivers using spatial diversity are often required for successful communications.

Underwater Acoustic Communication Channel

The underwater acoustic communication channel is different from the RF channel in three respects: (1) the long multipath delay due to sound refraction and long duration of reverberation from the ocean boundary; (2) the severe signal fading due to time-variable transmission loss; and (3) the high Doppler spread/shift, i.e., the variability and offset of receiver frequency and phase relative to the transmitter resulting from the media and/or platform motion. The Doppler spread determines the signal coherence time assuming that the equalizer is able to update itself within the given coherence time. Because of these differences, the various techniques for radio frequencies (RF) communications cannot be applied directly to underwater acoustic communications.

Wireless radio communications are by line of sight with some multi-paths by reflection from nearby building and structure. Multi-path interference can usually be removed by antenna beamforming using an antenna on a horizontal plane. The array configuration can be designed with element spacing and configurations based on a plane wave model: the array aperture determines the width of the beam and element spacing determines the level of the side-lobes. Multi-paths in the oceans arrive with different vertical depletion/elevation angle. Array beamforming and diversity combining techniques can be used to mitigate the signal spreading by multi-path propagation. These two techniques are based on fundamentally different principles. To combat multi-paths, a vertical array or a planner array having some vertical aperture will be required. An array must have wide spacing between elements and hence large (vertical) aperture to combat signal fading by diversity combining. An array must have close spacing between elements to achieve the array gain by coherent beamforming. How to achieve both depends on the spatial coherence of the signal, which is normally not an issue in RF communications.

Multipath delays in underwater acoustic channels can last tens to hundreds of milliseconds, causing inter-symbol interference to extend over tens to hundreds of symbols depending on the carrier frequency and symbol rate. Inter-symbol interference in RF channels is orders of magnitude less and thus easier to deal with. Doppler shift of carrier frequency in underwater acoustic channels is several orders of magnitude larger than that of the RF channel since the sound speed is many orders lower than the speed of light. Hence, carrier frequency identification and symbol synchronization are critical for underwater systems. In addition, Doppler spread is non-negligible in the underwater communication channel as sound propagates through a random ocean medium and scatters from moving surfaces.

In a random medium, signal phase and amplitude fluctuations resulting from propagation through random environments are range, source, and receiver depth- and frequency-dependent. The temporal scale of fluctuations dictates the rate of adaptation for a coherent processor. The magnitude of the fluctuations determines how well the adaptation will work. Since successful communications require a sufficient input signal-to-noise ratio (SNR), appropriate placement of the source and receiver are necessary to avoid the "shadow" zones (areas where transmission loss is high). Random media increase the probability of signal fading; signal fading occurs when multipath arrivals interfere destructively.

The effects of random media on acoustic communications can be grouped into five areas: (a) signal amplitude fluctuations, which affect the ability of the modem to trigger on the probing signal (e.g., Barker code) and to decode the symbols properly; (b) signal phase fluctuations, which affect the performance of the phase locked loop; (c) temporal coherence of impulse response functions, which affects the performance of the channel equalizer; (d) Doppler spread and frequency coherence bandwidth, which limit the maximum data rate of underwater acoustic communications in an ocean channel; and (e) spatial coherence of the multipath signals, which determines the optimal use of multiple receivers. The effects of the ocean acoustic environments on the performance of phase coherence communications requires an environmental adaptive approach to estimate the signal propagation and noise characteristics in a particular ocean environment to improve the communication algorithm performance.

Multi-channel data have been processed using (1) conventional/adaptive beamforming followed by channel equalization or (2) adaptive multi-channel combining with spatial diversity. The purpose of (1) conventional or adaptive beamforming can be to improve the SNR or to simplify the multipath structure (when the multipath arrivals have significant angular spread) and thereby improve the performance of the channel equalizer. Separation of the multipaths often requires high angle resolution, which can be achieved using adaptive (e.g., minimum variance distortionless response) beamforming. Adaptive beamforming can be used to null undesired arrivals (such as surface reflected returns). In one implementation, conventional array beamforming (employing techniques such as delay and sum of the element data, or phase steering of the frequency components, or eigenvector analysis of the coherent path is used to estimate the arrival angle of the incident multipath based on, for example, the initial trigger pulse (e.g., a short LFM signal). Conventional beamforming in the frequency domain, illustrated in FIG. 1, is given by $$B^{CB}(\theta) = \Sigma_n e^{-ikx_n \sin\theta} p(x_n)$$

where $x_n$ is the coordinate of the nth phone and is the trigger signal. The beam with the maximum power determines the main arrival angle of the signal. The beamformed output is often processed with the single channel decision feedback equalizer since only one array is involved.

An implementation of adaptive beamforming that employs a complex FIR filter in the base band with filter tap coefficients estimated/updated based on a decision directed tracking (using, for example, the MLMS criterion) is shown in FIG. 2. In the case of high signal-to-noise (SNR) input signals, the optimum weights, in terms of MLMS error, are those that define the optimum angular response of the array (e.g., nulls in the direction of the interferers). However, the MLMS algorithm is known to have difficulties in low input SNR cases as decisions often encounter large errors. On the other hand, the delay and sum beamforming is based on the prior knowledge of the array element spacing, and it works even for low SNR input signals.

Conventional and adaptive beamforming requires that the signals are coherent between the sensors. To avoid spatial aliasing, the phones should be spaced at close to half wavelength or less of the acoustic signal. To eliminate multipath arrivals, the array must have a sufficiently large aperture to provide the necessary angular resolution to separate the multipath arrivals. But if the angle of the multipath arrivals changes rapidly over a relatively small number of symbols, the beamformer may lack the ability to track the optimum angular response as in the case of decision directed tracking due to its slow convergence rate. The MLMS can be applied to an array of widely space phones. It cannot avoid the array aliasing problem.

The various output beams can be combined using the multi-channel combining algorithm of U.S. Pat. No. 5,844,951. This is referred to as beam diversity. It is not widely used because of the difficulty of tracking individual beams as a function of time. Adaptive multi-channel combining using the MLMS algorithm can be used to combat signal fading in a time varying channel, when the signal fading is unsynchronized between channels. This usually requires widely spaced elements of receivers. It is usually known as a technique of spatial diversity. Indeed, in a ducted ocean waveguide, it is unlikely that a flat wave front will be incident on all elements of the array and each element will effectively see a different channel. Fading will likely be independent between elements and a high probability exists that the signal will be well received on at least one channel.

Adaptive multi-channel combining uses a similar structure as the MLMS beamformer of FIG. 2. When the elements of the array are widely spaced array it is essentially diversity combining. When the elements of the array are closely spaced, it yields practically the same output as the delay and sum A beamformer for high SNR cases. The MLMS algorithm is in this context a simultaneous beamforming and equalization technique. As remarked before, it does not work for low SNR cases and, it has the grating lobe (array aliasing) problem when array elements are widely spaced.

An implementation of the multi-channel processor using joint phase-locked loop and decision feedback equalizer is shown in FIG. 3. As is the case of a single channel equalizer, the MLSE algorithm requires an input SNR typically greater than 10–15 dB for reliable channel updating. Multi-channel decision feedback equalizer becomes computationally prohibitive in the case of long multi-path spread (>100 symbols) and requires a sparse equalizer to reduce the number of tap coefficients. In the latter case, the channel impulse response estimate also requires high SNR for reliable estimation of the locations of the tap coefficients. Even with the sparse equalizer, multi-channel spatial diversity is limited to a few channels as the computational load becomes excessive beyond that. Computational load goes as square of the number of the channels. It can only process a selected number of channels on a vertical array.

DISCLOSURE OF THE INVENTION

According to the invention, an apparatus for phase coherent underwater communications includes a transmitter; a receiver, including a processor for jointly performing coherent diversity combining, carrier recovery, channel equalization and synchronization; and an antenna array that includes a plurality of antenna sub-arrays for alternately transmitting a signal generated by the transmitter, e.g. to a designated node in the communication network, when in the sound transmitting mode, and for receiving an incoming signal, e.g. from another node in the communication network. Each of the antenna sub-arrays includes a plurality of underwater sensors positioned such that each of the sensors is spaced at about one half the wavelength of the receiver/transmitter operating frequency from any adjacent sensor in the same sub-array. At least one of the sub-arrays has a centerpoint vertically spaced apart from a centerpoint of an adjacent sub-array at a distance about equal to or larger than a vertical correlation length of a received signal.

Also according to the invention, a method for conducting underwater communications includes the steps of receiving a communications signal at each sub-array; beamforming each sub-array reception to produce a beamformed signal for each sub-array, preferably using delay-and-sum processing; diversity-combining the beamformed signals coherently to form an output signal; and detecting the output signal. In establishing the desired two-way communications channel, additional steps then include establishing a desired direction for projecting a transmission signal; and transmitting the transmission signal in the desired direction to thereby establish the underwater communications channel.

The invention provides a reduction in the minimum number of receiver channels from a physically large number of underwater sensors and a minimum input signal-to-noise ratio at the input of the underwater sensors required for successful communication (per fixed bit error rate and baud rate).

The receiver/transmitter configuration consists of a spatially distributed sub-arrays, having a sufficient vertical aperture. The individual sub-arrays are preferably beamformed using a plane-wave delay-and-sum (or phase-steering) method rather than the MLMS method. The outputs of the sub-array beamforming are used as inputs to the diversity-combining algorithm. Thus despite a total of many elements of underwater sensors used physically, the communications algorithm (the channel equalizer) sees effectively only a small number of channels. This reduces the processing time by orders of magnitude compared with the prior art diversity combining methods applied to all or many of the physical elements of underwater sensors. The sub-arrays beamformed outputs have a sufficiently high signal-to-noise ratio needed for a reliable estimation of the channel impulse response function for setting the number and locations of the tap coefficients used in the sparse channel equalizer.

Additional features and advantages of the present invention will be set forth in, or be apparent from, the detailed description of preferred embodiments which follows.

BRIEF DESCRIPTION OF THE DRAWINGS

FIG. 3 is a schematic diagram of a multi-channel (spatial diversity) combiner as in the prior art.

FIGS. 4a–e illustrate sub-array configurations for long-range acoustic communications, with a prior art configuration shown in FIG. 4a and configurations as in the invention shown in FIGS. 4b–e.

BEST MODE FOR CARRYING OUT THE INVENTION

Figure 1:
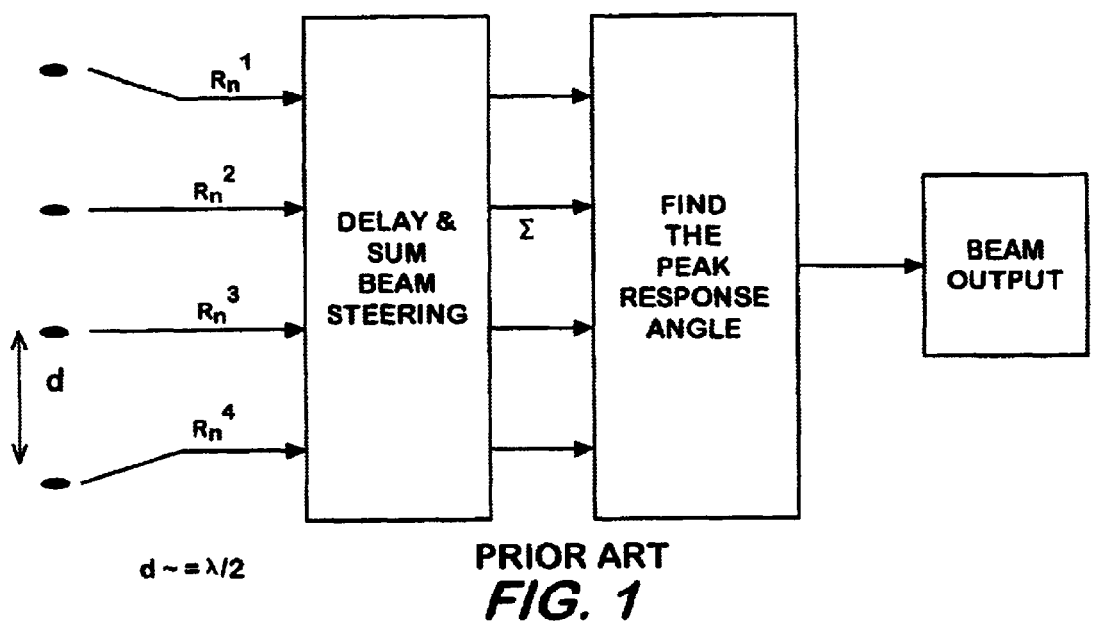
FIG. 1 is a schematic diagram of conventional array beamforming as in the prior art.
Figure 2:
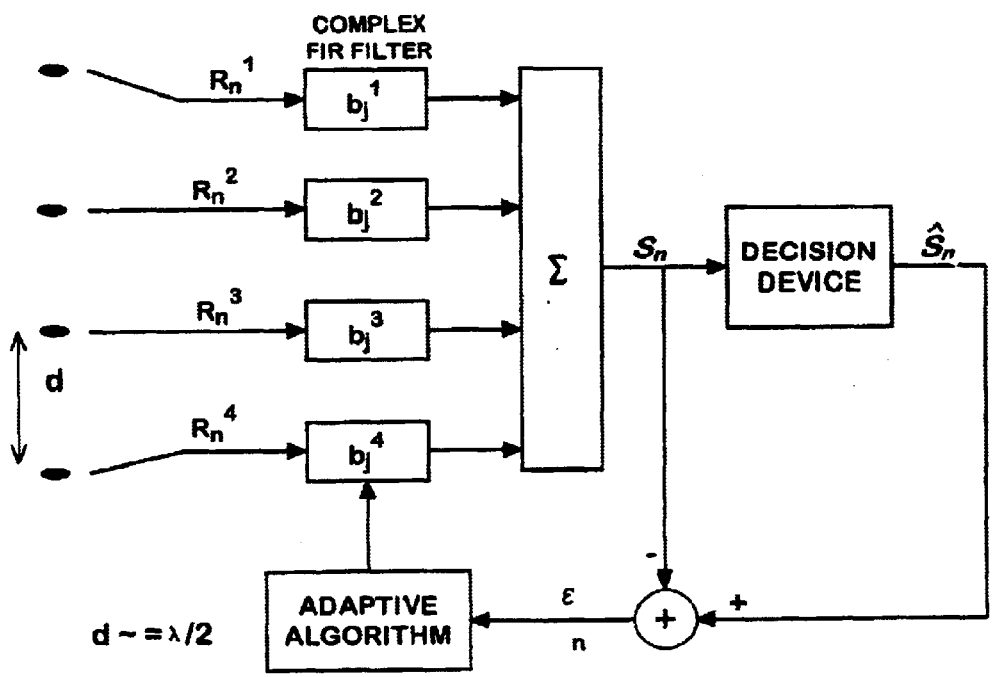
FIG. 2 is a schematic diagram of an adaptive array beamforming based on the minimum least-mean-square estimate of the desired output as in the prior art.

Definition(s): As used herein, the term "underwater sensor" includes, but is not limited, to a device capable of receiving an acoustic signal in the water and of producing a signal processable by a receiver. The underwater sensor may be an omni-directional hydrophone, typically used as a receiving sensor; a transducer, operating both as a receiver and a transmitting element; or a component of a sonar system that functions as a directional hydrophone and a directional transmitting element, to name but a few.

Referring now to FIGS. 4a–e, the coherent underwater communications system 10 of the invention includes a spatially distributed set of antenna sub-arrays 12, each having a plurality of sensors 14, e.g. hydrophones, which are spaced at a distance d, approximately equal to or less than the half wavelength of the acoustic signal, and each having a sufficient vertical aperture 14, as illustrated in FIGS. 4b–e. Each sub-array 12 has a centerpoint 16 which is spaced apart from the centerpoint 16 of an adjacent sub-array 12 at a distance D, D is about equal to or greater than L, where L is the vertical correlation length of a received signal for sub-arrays which are vertically spaced and is the spatial correlation length of a received signal for sub-arrays which are displaced both vertically and horizontally. Vertical/spatial correlation length of a signal is the distance between two receivers at which the normalized cross-correlation of the signals between the two receivers drops to $1/e(\sim 0.37)$. The magnitude of vertical correlation length varies from ocean to ocean and is typically a few wavelengths or higher depending on the acoustic frequency. The horizontal correlation length is usually greater than tens of wavelengths. Consequently, measurements or knowledge of the vertical coherence are desirable in order to maximum the array performance. For comparison, FIG. 4a shows a typical prior art vertical array with underwater sensors 14 that are uniformed spaced and not configured into separate beamforming sub-arrays.

FIG. 4b is an embodiment using three sub-arrays 12 each having five underwater sensors 14 where the sub-arrays are aligned along a common vertical axis. FIG. 4c illustrates a three sub-array arrangement in which two sub-arrays 12 are positioned along a common vertical axis with their centerpoints 16 equidistant from centerpoint 16 of the third sub-array 12, which is positioned parallel to the common vertical axis of the first two sub-arrays. In this configuration, the spacing D between sub-arrays 12 may be determined by extending a line normal to the axis along which elements 14 lie in each sub-array 12, through each centerpoint 16, and spacing these at distance D apart as shown. In this embodiment, the three sub-arrays are physically parts of a long vertical array with the middle sub-array 12 in FIG. 4c sharing two underwater sensors with the upper sub-array 12 and sharing two underwater sensors with the lower sub-array 12. Performance data for this arrangement was obtained and is discussed further below, in reference to FIG. 8.

FIG. 4d shows another embodiment using three horizontal sub-arrays 12 in a vertical plane with vertical separations between the adjacent sub-arrays 12 equal to D. Horizontal beamforming outputs from the sub-arrays 12 at the signal look direction are used for the multi-channel equalizer. Another embodiment uses multiple horizontal sub-arrays symmetrically distributed on the surface of a cylinder. FIG. 4e shows a specific example using three horizontal arrays 12 forming a triangle from the end view. The bottom two sub-arrays 12 are on a horizontal plane. The vertical distance between the top sub-array 12 and the plane containing the bottom two sub-arrays 12 is equal to D. The sub-arrays 12 can be mounted on the surface or the outside of an underwater vehicle, in this case, only the beamformed outputs of two sub-arrays will be used for spatial diversity as the third sub-array may be blocked by the vehicle from receiving the signal. Sub-arrays 12 preferably have wide beam width in the elevation/depletion angle to include the dominant vertical arrivals despite the fluctuations. This can normally be achieved for both vertical and horizontal sub-arrays.

Figure 5:
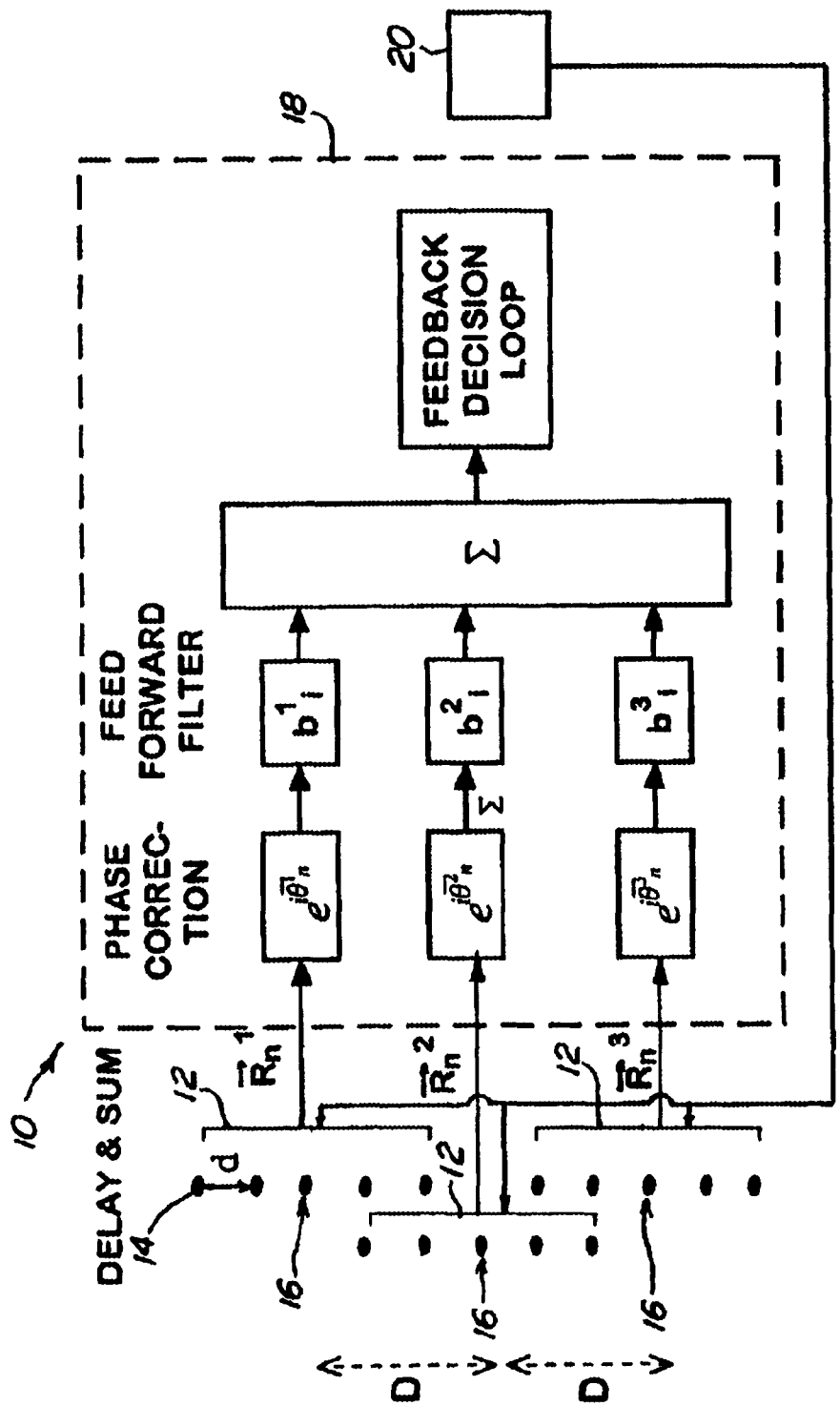
FIG. 5 is a schematic diagram of an embodiment according to the invention.

Referring now to FIG. 5, the underwater communications system 10 includes a three sub-array 12 configuration as is shown in FIG. 4c. When employing a receiver 18, sub-arrays 12 are preferably beamformed using the delay-and-sum method. The beamformed outputs are processed using the spatial. diversity as shown in FIG. 5. D is determined as described above and the distance d between underwater sensors 14 is about half a wavelength of the received acoustic signal, in order to keep the signal coherent between the elements of an array and minimize spatial aliasing as discussed above. Despite physically a large number of sensors in the multiple arrays, the input to the equalizer is a small number of channels, typically less than 3–4. The key to this approach is an estimate of the spatial coherence length of the communication signals and an appropriate placement of the multiple arrays.

To make the equalizer work with low-input (~1–2 dB) SNR data, the processor utilizes the array gain from array beamforming. To maintain low bit error rates and combat signal fading, the centers of the multiple arrays need to be widely spaced so that their beamformed outputs exhibit spatial diversity.

In contrast to beamforming which uses the entire array to separate the multipaths, the preferred embodiment uses a wide beam width to include multipath arrivals at different angles, and does not require high angular resolution. To accomplish this, a small number of elements 14 with aperture less than, e.g., 10 wavelengths, is used. This minimizes the total number of elements 14 and is desirable form the practical point of view. In contrast to the spatial diversity method, which does not require a precise knowledge of sensor spacing, the preferred embodiment requires a prior measurement of the exact sensor spacing d on each sub-array 12, for processing low SNR data.

System 10 when in the transmission mode employs a transmitter 20 that provides a communications signal to the sub-arrays 12 that preferably are a directional array to project a transmission in a desired direction.

The array of sensors or hydrophones can also be used as transmitters, using the same beamforming algorithm used for processing the received message to project the signal so that the signal will focus on the intended receivers of the acoustic communication messages.

Figure 6:
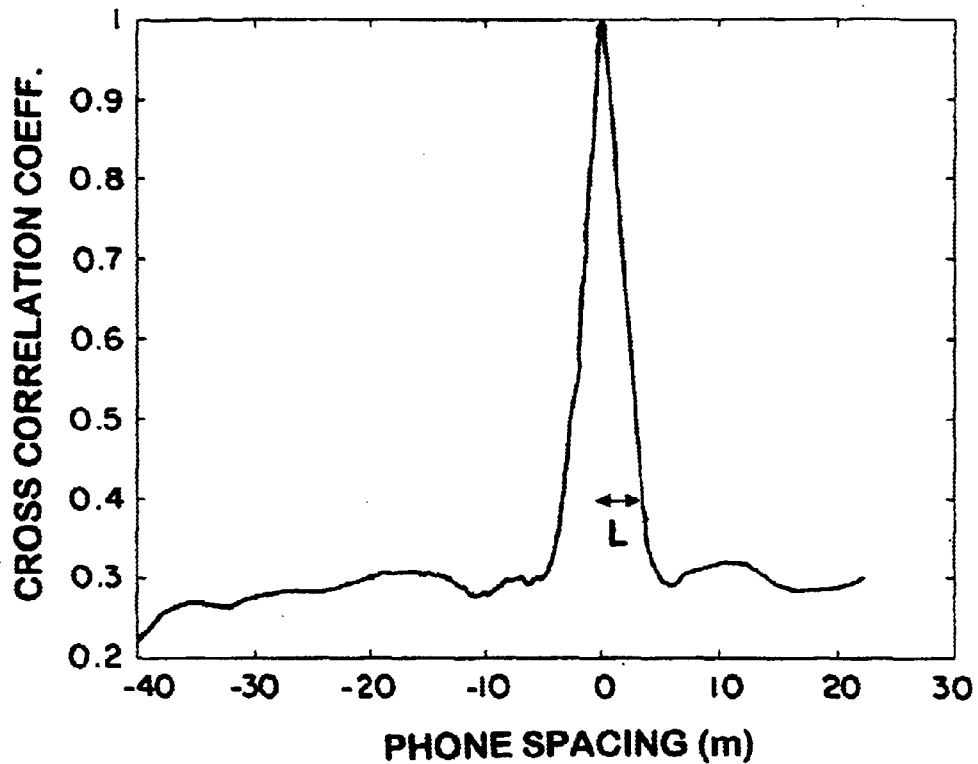
FIG. 6 shows the vertical coherence as a function of phone spacing measured from the channel probe (e.g., Barker code) signal.

FIG. 6 shows an experimentally measured signal correlation as a function of vertical separation between two underwater sensors at different separations. The vertical correlation length is about 4 m. The correlation was measured from data on the Adventure Bank, Sicily. The signal had a center frequency of 1.2 kHz and a bandwidth of 500 Hz, and was transmitted to a range of 10 km. A fixed source and receiver array were used so that Doppler shift would not be an issue. The source was mounted at ~4 m above the seafloor. The receiver array contained 20 phones spaced at 1 m deployed a few meters above the bottom. The vertical correlation length is practically independent of the reference phone used.

Figure 7:
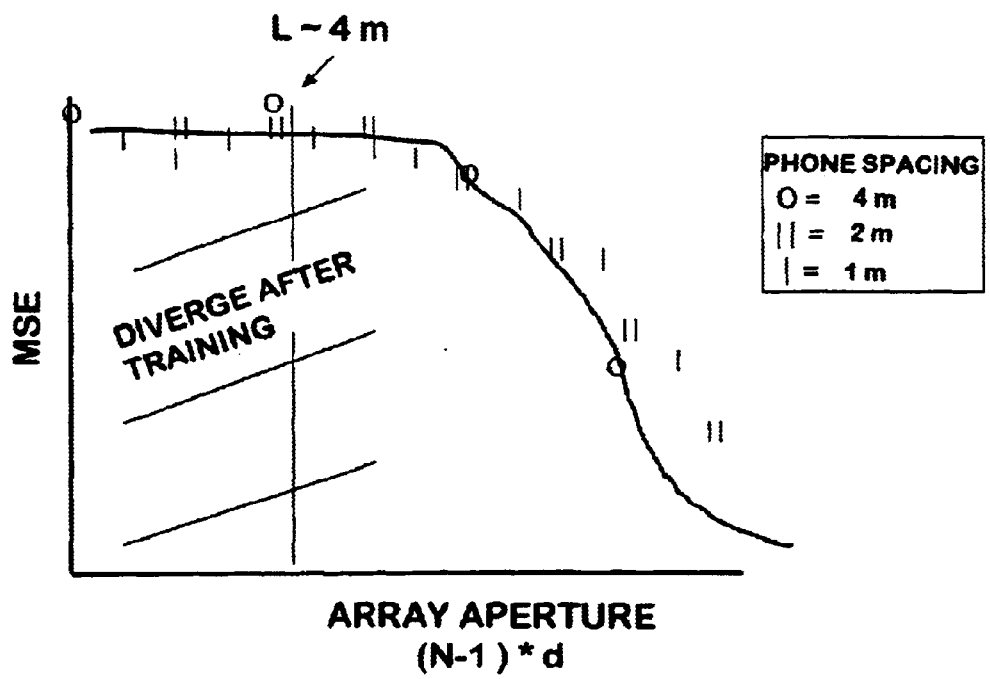
FIG. 7 shows MSE as a function of array aperture using multiple channel spatial diversity for arrays with 1, 2 and 4 m spacing according to the invention.

To evaluate the multi-channel diversity gain, the average MSE of the OPSK signals was plotted as a function of the number of elements in FIG. 6 for three uniformly spaced sub-arrays at 1 m, 2 m, and 4 m spacing. There is no significant improvement in the MSE until elements spaced at $\geq 4$ m (from the 1st sensor) are added to the multi-channel equalizer, irrespective of the phone spacing. In other words, the elements that are closely spaced practically do not contribute to the diversity gain. In general, the diversity gain from coherent multi-channel combining is negligible where there is a high degree of coherence between the signals at each element. In practice, sonar arrays usually include many elements that are closely spaced at near half-wavelengths. The majority of these elements are not contributing toward minimizing the bit errors using the multi-channel spatial diversity combiner. They require huge computations and are wasting the processor power. The preferred embodiment is to divide the array into sub-arrays and limit the multi-channel equalizers to a few sub-arrays as shown in FIG. 5. FIG. 7 shows MSE as a function of array aperture using multiple channel spatial diversity for arrays with 1, 2 and 4 m spacing.

Figure 8:
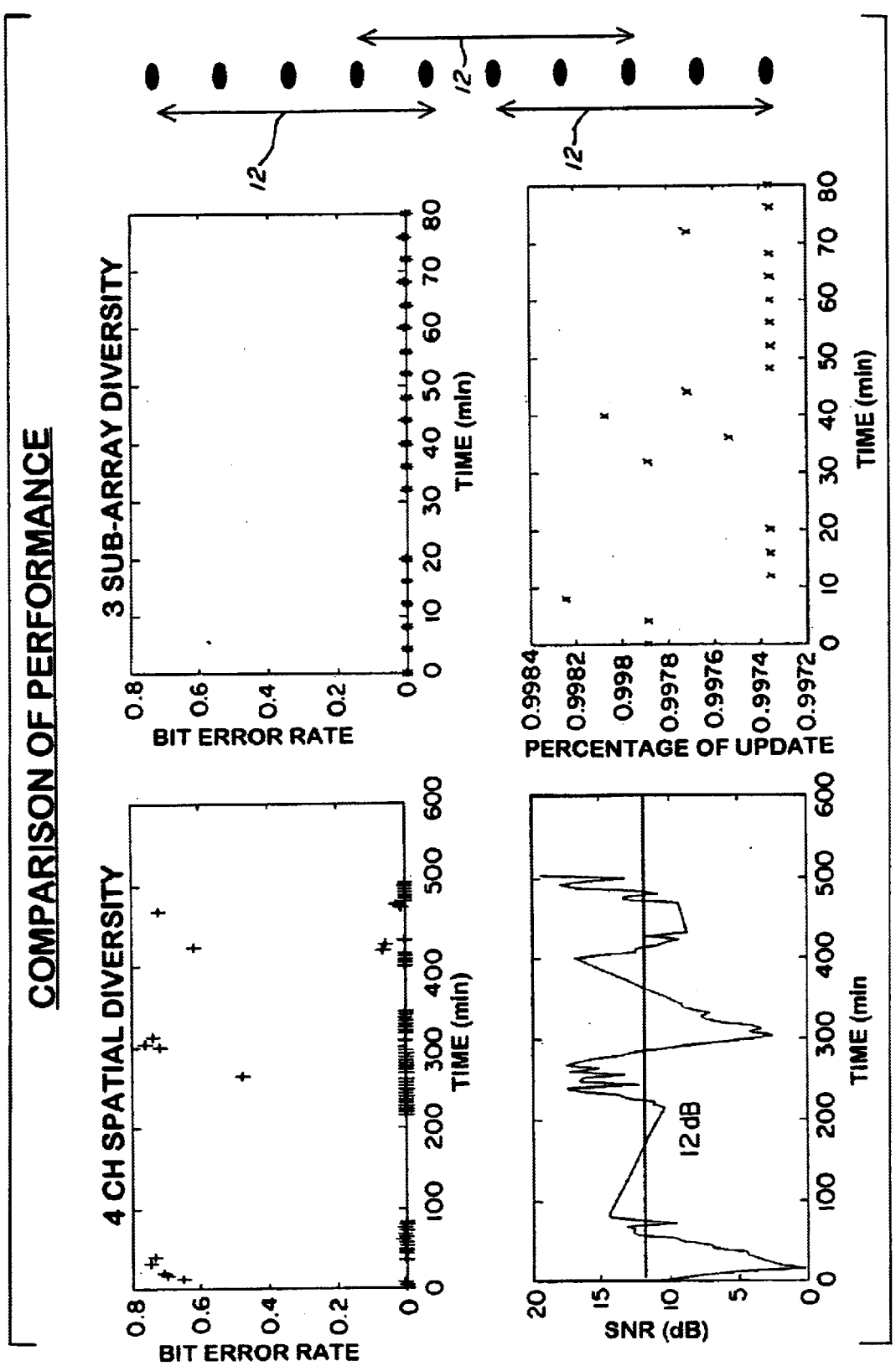
FIG. 8 shows the BER (upper left) and the corresponding input SNR (lower left) using 4 channel DFE for a period of ~9 hours. The upper right figure shows the BER for the first 80 min of the data using the beamformed output of three sub-arrays as indicated by the arrows. The lower right figure shows the rate of update of the equalizer.
Figure 9A:
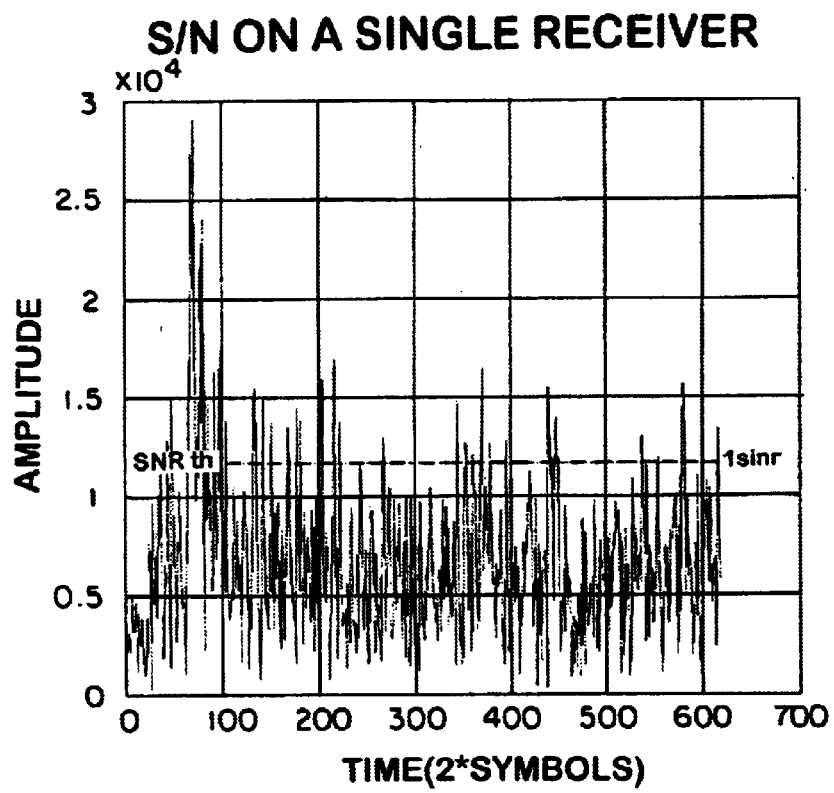
FIGS. 9a–b show the impulse response for a single channel with low SNR (FIG. 9a) and the same after beamforming using 4 sensors (FIG. 9b).
Figure 9B:
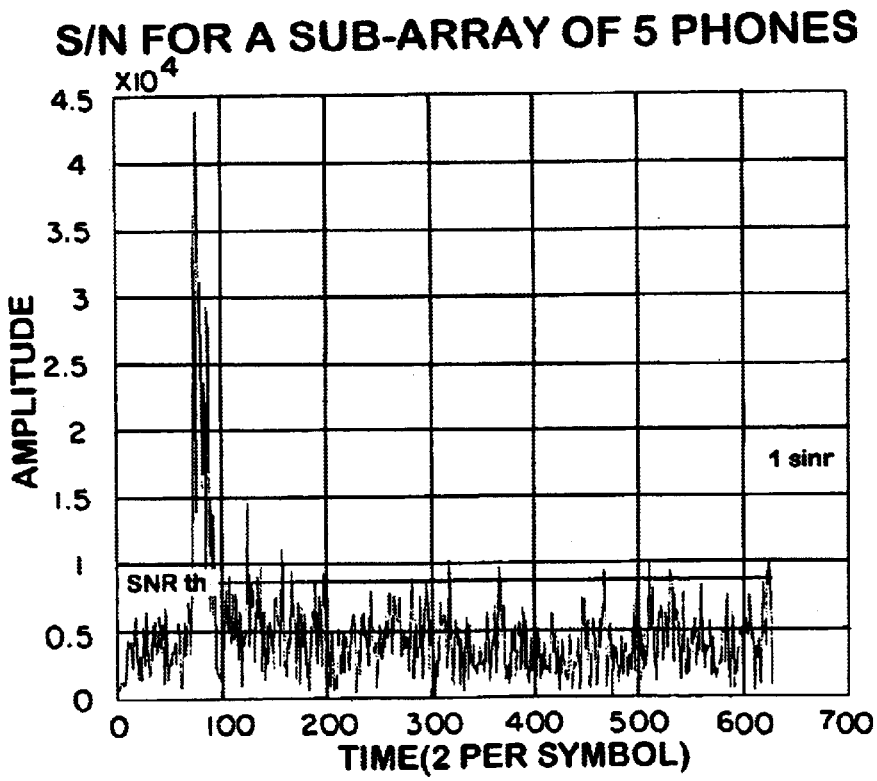

In order to compare the performance of the combined beamforming/spatial diversity method with that using only the multi-channel DFE, an array of 10 phones spaced 2 m apart is employed. FIG. 8 shows the BER of these two methods and also the array configuration on the right hand side. The multi-channel DFE used 4 phones 14 separated by 6 meters so that the signals were uncorrelated between the elements. (The correlation length was ~4 m.) For the combined beamforming/spatial diversity method, three overlapping sub-arrays 12 were used, each containing five phones. The 4-channel DFE worked when the SNR was above ~8–10 dB but failed (BER >80%) for SNR <8–10 dB. FIG. 8 shows the BER using 4 channel DFE (upper left) and the corresponding input SNR (lower left) for a period of ~9 hours. The array configuration is shown on the right and corresponds to that shown in FIG. 1c. The 4 channels 14 are used for DFE. The upper right figure shows the BER for the first 80 min of the data using the beamformed output of three sub-arrays as indicated by the arrows. The BER was minimal even when the SNR was as low as ~1–2 dB. The lower right figure shows the rate of update of the equalizer. The method of combined beamforming/spatial diversity works well, even when the SNR at the element level is as low as 1–2 dB, as shown in the upper right plot in FIG. 8. FIG. 9a shows the channel impulse estimated from the Barker code for the ~2 dB SNR case for which many (unnecessary) tap coefficients will be selected based on a threshold. FIG. 9b shows the impulse response estimated after beamforming for which the tap assignment will be much less ambiguous. In comparison, there is an improvement in SNR of ~6–7 dB which is consistent with array beamforming of 5 elements.

The delay-and-sum array beamforming yields an array gain of the order 10 times the natural log of the number of the array elements. Since only the output SNR of the individual array needs to be above the typical minimum required level of 10–15 dB, the input SNR, which is the SNR in the water, can be lower by an amount equal to or less than the array gain. Since the signal level at the element level decreases logarithmetically with range in most oceans, weaker signal level means longer range for underwater acoustic communications.

The array beam pattern has a wide enough beam width to include most of the vertical multipaths as opposed to some beamforming approaches which use beamforming to eliminate the multipaths. Maximum signal power is accordingly available for long-range communications.

The array output results in an improvement for the estimation of the channel impulse response and consequently a more precise allocation of the feed forward and feedback tap coefficients. The prior art estimates the channel impulse response at the element level, which, because of the low SNR at the element level, has difficulty to find the weak scattered multipath returns from the noise background.

To achieve the above-mentioned improvement a technique to estimate the spatial correlation of the signal is required. This can be accomplished using data collected on a vertical array prior to the deployment, and based on that to select sensors or design the sensor configuration to optimize communication performance.

Obviously many modifications and variations of the present invention are possible in the light of the above teachings. It is therefore to be understood that the scope of the invention should be determined by referring to the following appended claims.

I claim:

1. A phase coherent underwater communications channel antenna array, comprising:
   a plurality of underwater antenna sub-arrays, wherein:
   each of said sub-arrays includes a plurality of underwater sensors positioned such that each of said sensors is spaced at about one half the wavelength of a receiver/transmitter operating frequency from any adjacent sensor in the same sub-array; and
   at least one of said sub-arrays has a centerpoint vertically spaced apart from a centerpoint of an adjacent sub-array at a distance about equal to or larger than a vertical correlation length of a received signal.

2. An antenna array as in claim 1, wherein said sub-arrays are positioned along a substantially vertical common axis and said plurality of sensors of said sub-arrays are also positioned along said substantially vertical common axis.

3. An antenna array as in claim 1, wherein said sub-arrays include two sub-arrays positioned along a substantially vertical common axis and a third sub-array positioned parallel to said common axis and having a centerpoint positioned about equidistant from the centerpoint of each of said two sub-arrays, whereby said two sub-arrays have elements horizontally overlapping elements of said third sub-array.

4. An antenna array as in claim 1, wherein said sub-arrays are vertically stacked and said plurality of sensors of each said sub-array are positioned along a substantially horizontal axis of each said sub-array.

5. An antenna array is in claim 1, wherein said sub-arrays are distributed on the surface or outside of an underwater vehicle and said plurality of sensors of each said sub-array are positioned along a substantially horizontal axis of each said sub-array.

6. An antenna array as in claim 1, wherein each said sub-array is coupled to a beamforming processor.

7. An antenna array as in claim 6, wherein each said beamforming processor is a plane-wave delay-and-sum processor.

8. An antenna array as in claim 1, comprising three said sub-arrays.

9. An antenna array as in claim 8, wherein each said sub-array includes five sensors.

10. An antenna array as in claim 1, comprising four said sub-arrays.

11. An antenna array as in claim 10, wherein each said sub-array includes five sensors.

12. An apparatus for phase coherent underwater communications, comprising:
   a transmitter;
   a receiver including a processor for jointly performing coherent diversity combining, carrier recovery, channel equalization and synchronization; and
   an antenna array comprising a plurality of antenna sub-arrays for alternately transmitting a signal generated by the transmitter and for receiving an incoming signal, and wherein:
   each of said sub-arrays includes a plurality of underwater sensors positioned such that each of said sensors is spaced at about one half the wavelength of a receiver/transmitter operating frequency from any adjacent sensor in the same sub-array; and
   at least one of said sub-arrays has a centerpoint vertically spaced apart from a centerpoint of an adjacent sub-array at a distance about equal to or larger than a vertical correlation length of a received signal.

13. An apparatus as in claim 12, wherein the processor includes plane wave delay-and-sum processing.

14. An apparatus as claim 12, wherein the number of sub-arrays is three.

15. An apparatus as in claim 14, wherein each said sub-arrays includes five sensors.

16. A method for conducting underwater communications, comprising the steps of:
   providing a plurality of antenna sub-arrays, wherein:
   each of said sub-arrays includes a plurality of sensors positioned such that each of said sensors is spaced at about one half the wavelength of a receiver/transmitter operating frequency from any adjacent sensor in the same sub-array; and
   at least one of said sub-arrays has a centerpoint vertically spaced apart from a centerpoint of an adjacent sub-array at a distance about equal to or larger than a vertical correlation length of a received signal;
   receiving a communications signal at each said sub-array;
   beamforming each said sub-array reception to produce a beamformed signal for each said sub-array;
   diversity-combining said beamformed signals coherently to form an output signal; and
   detecting said output signal.

17. A method as in claim 16, further comprising the steps of:
   establishing a desired direction for projecting a transmission signal; and
   transmitting said transmission signal in said desired direction to thereby establish an underwater communications channel.

18. A method as in claim 16, wherein the beamforming is performed using delay-and-sum processing.

19. A method as in claim 16, wherein the number of sub-arrays is three.

20. A method as in claim 19, wherein each said sub-array has five sensors.

* * * * *